(12) United States Patent
Pettersson et al.

(10) Patent No.: US 10,322,548 B2
(45) Date of Patent: Jun. 18, 2019

(54) DEVICE AND METHOD FOR SPLICING

(71) Applicant: Tetra Laval Holdings & Finance S.A., Pully (CH)

(72) Inventors: Thomas Pettersson, Stockamöllan (SE); Peter Öhman, Lund (SE)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 0 days.

(21) Appl. No.: 15/310,305

(22) PCT Filed: May 7, 2015

(86) PCT No.: PCT/EP2015/060123
§ 371 (c)(1),
(2) Date: Nov. 10, 2016

(87) PCT Pub. No.: WO2015/173122
PCT Pub. Date: Nov. 19, 2015

(65) Prior Publication Data
US 2017/0239879 A1    Aug. 24, 2017

(30) Foreign Application Priority Data

May 12, 2014 (SE) ...................... 1450553

(51) Int. Cl.
| | |
|---|---|
| *B29C 65/00* | (2006.01) |
| *B29C 65/02* | (2006.01) |
| *B29C 65/18* | (2006.01) |
| *B29C 65/78* | (2006.01) |
| *B65H 21/02* | (2006.01) |
| *B65H 19/18* | (2006.01) |
| *B29L 31/26* | (2006.01) |

(52) U.S. Cl.
CPC .......... *B29C 66/1122* (2013.01); *B29C 65/02* (2013.01); *B29C 65/7817* (2013.01);
(Continued)

(58) Field of Classification Search
CPC . B29C 66/1122; B29C 66/43; B29C 65/7832; B29C 66/98
(Continued)

(56) References Cited

U.S. PATENT DOCUMENTS

| | | |
|---|---|---|
| 4,455,190 A | 6/1984 | Bianchetto et al. |
| 2004/0074590 A1 | 4/2004 | Canti et al. |

(Continued)

FOREIGN PATENT DOCUMENTS

| | | |
|---|---|---|
| EP | 1 184 311 A1 | 3/2002 |
| JP | H05-246592 A | 9/1993 |

(Continued)

OTHER PUBLICATIONS

Machine Translation of JP2011251728 (Year: 2011).*
(Continued)

*Primary Examiner* — Christopher T Schatz
(74) *Attorney, Agent, or Firm* — Buchanan Ingersoll & Rooney PC

(57) ABSTRACT

The present disclosure relates to a method for splicing a web of packaging material, comprising: guiding the web of packaging material through a splicing device comprising one or more imaging devices, a slitter, and a sealing unit; acquiring a first set of images of one or more areas of the packaging material, storing the acquired first set of images, slitting the web of packaging material in one or more locations to form a tail end and a head end of a web of packaging material, aligning the head end and the tail end and superimpose one on the other in preparation for forming a splice, utilizing the imaging devices and the stored acquired first set of images to fine tune the alignment of the head end and the tail end, sealing the splice.

8 Claims, 3 Drawing Sheets

(52) U.S. Cl.
CPC .......... *B29C 65/7832* (2013.01); *B29C 66/43* (2013.01); *B29C 66/72328* (2013.01); *B29C 66/853* (2013.01); *B29C 66/961* (2013.01); *B29C 66/9672* (2013.01); *B29C 66/98* (2013.01); *B65H 19/1852* (2013.01); *B65H 19/1878* (2013.01); *B65H 21/02* (2013.01); *B29C 65/18* (2013.01); *B29C 66/72321* (2013.01); *B29C 66/8242* (2013.01); *B29C 66/8322* (2013.01); *B29L 2031/26* (2013.01); *B65H 2301/4621* (2013.01); *B65H 2301/4634* (2013.01); *B65H 2301/46115* (2013.01); *B65H 2511/22* (2013.01); *B65H 2511/413* (2013.01); *B65H 2511/512* (2013.01); *B65H 2553/42* (2013.01); *B65H 2701/1944* (2013.01); *B65H 2801/81* (2013.01)

(58) Field of Classification Search
USPC ........................................................ 156/266
See application file for complete search history.

(56) References Cited

U.S. PATENT DOCUMENTS

| | | | |
|---|---|---|---|
| 2005/0167053 | A1 | 8/2005 | Gajewski et al. |
| 2006/0263594 | A1* | 11/2006 | Kraft .................... B31D 1/021 428/343 |
| 2012/0100978 | A1 | 4/2012 | Tommasi |
| 2014/0311654 | A1* | 10/2014 | Hansen .................. B29C 65/08 156/73.1 |

FOREIGN PATENT DOCUMENTS

| | | |
|---|---|---|
| JP | 2000-086033 A | 3/2000 |
| JP | 2011 251728 A | 12/2011 |
| RU | 2 306 251 C2 | 9/2007 |
| WO | WO 03/106315 A1 | 12/2003 |
| WO | WO 2010/128441 A1 | 11/2010 |

OTHER PUBLICATIONS

International Search Report (PCT/ISA/210) dated Sep. 3, 2015, by the European Patent Office as the International Searching Authority for International Application No. PCT/EP2015/060123.

Written Opinion (PCT/ISA/237) dated Sep. 3, 2015, by the European Patent Office as the International Searching Authority for International Application No. PCT/EP2015/060123.

Search Report dated Dec. 14, 2018, by the Russian Patent Office in corresponding Russian Patent Application No. 2016148204/10(077415). (2 pages).

Office Action (Notification of Reasons for Refusal) dated Jan. 8, 2019, by the Japanese Patent Office in corresponding Japanese Patent Application No. 2016-567598 and an English Translation of the Office Action. (6 pages).

* cited by examiner

DEVICE AND METHOD FOR SPLICING

TECHNICAL FIELD

The present disclosure relates a device and a method for combining the ends of two webs of packaging material, referred to as splicing of packaging material

BACKGROUND

Packaging material, in particular packaging laminate comprising a core of fibrous material, such as paper board or carton board is manufactured in sequential steps. The order of the steps, as well as the contents of a particular step may vary, yet as an example the process may start with the production of the board.

The board is produced in a paper mill and rolled onto large-sized rolls and shipped to a converting facility. In the converting facility the large-size rolls are unrolled and additional layers, usually plastics and or aluminium foil, is extruded (or laminated) onto the surfaces of the board, and rolled onto a new roll. In the same, or in a previous or a subsequent the web of material may also be provided with a suitable décor and crease lines, i.e. weakening lines providing guides when a subsequent packaging container is to be folded.

At some step during the process the first large-size roll is divided into multiple rolls in a width direction. The resulting rolls may typically have a width corresponding to a crease pattern in a first direction for a single packaging container and a length corresponding to the crease patterns in a second direction for a specific number of packaging containers. The specific number is typically in the order to thousands of packaging containers, but there is obviously a maximum amount of packaging containers that could be fitted onto a single roll.

The above process is described in a rudimentary manner, and more information should be readily available to the skilled person. In EP1184311 by the present applicant additional background information may be found.

In the cited application some examples of where splicing may be applied is given, and while that application describes splicing in a filling machine splicing may be and is applied in any step of the manufacture of roll of packaging material. Typical examples are when an additional length of packaging material has to be added to an existing roll, and when a portion of the web has been removed since it contains a defect. The latter is often referred to as "doctoring".

Paraphrasing the background section of another application to the present applicant, namely WO03106315, may act as a suitable background description for the present application as well:

Packs for liquid foods, for example juices or milk, are known, comprising plastic-coated paper, cardboard or generally a coated fibre layer. Such packs are produced in known filling machines from individual rolls from which the respective material web is drawn. Such individual rolls comprise a wound material web which is previously embossed, stamped, laminated and so forth. The filling machine continuously produces the liquid packs, with the material web being continuously withdrawn from the individual roll. When the individual roll is exhausted, a reserve roll must be in readiness in good time and the trailing edge of the 'old' material web of the exhausted individual roll must be joined to the pre-prepared leading edge of the new individual roll. That method of joining the two material webs is also referred to as 'splicing'.

In regard to processing individual rolls in filling machines, it is also known that a cut, open edge of the fibre layer, for example the paper layer, leads to swelling and a loss of sealing integrity upon coming into contact with the packaged liquid.

Therefore previously cited EP1184311 already discloses a method of providing one of the two transverse edges of the material webs with an inclined cut and then, with the acutely terminating edge of the material web being bent over, glueing it in such a way that a liquid-tight weld is provided on the product side. In that way the originally open surface of the fibre layer is covered by plastic material and liquid-tightly welded.

In the case of the individual rolls which are processed in filling machines, heat and pressure can be applied simultaneously over the complete width of the material web by clamping a first bar against a second one, so that, in combination with the inclined cut, it is possible to produce liquid-tight packs.

The individual rolls are produced by cutting machines which make it possible to cut the desired number of individual rolls from a large wide master roll, after the steps of laminating, printing, coating and so forth.

The problem of the wide material web and thus exhaustion of the first roll is known. It was however hitherto difficult if not impossible for the trailing edge of a wide master roll to be glued to the leading transverse edge of the reserve master roll, for, by virtue of the width of for example 1.6 m of a master roll, it was not possible for pressure and heat to be applied in the correct amount and at the right time to the complete width of the transverse edge of a material web in such a way that it was possible to produce an adhesive join of good quality and with good liquid-tight sealing integrity.

At a subsequent time the smaller roll may be shipped to a filling machine where it is arranged in a packaging machine or filling machine, from which filled packaging containers are output.

Using the above as a starting point there are still improvements to be made. In that context it should be stated that any improvement in the area of splicing and similar operations may have a direct impact on the time spent on the operation, on the quality of the result on the amount of waste generated in downstream processes etc.

The present disclosure aims at providing a new method and device for splicing, having the purpose of providing a high consistent performance and increased efficiency.

SUMMARY

To that end the present disclosure may be said to, according to a first aspect thereof, relate to a method for splicing a web of packaging material. The method comprises guiding the web of packaging material through a splicing device comprising one or more imaging devices, a slitter, and a sealing unit. In the method the imaging devices are used to acquire a first set of images of one or more areas of the packaging material, the first set of images being stored in a temporary or permanent memory. Following that operation the web of packaging material is slit in one or more locations to form a tail end and a head end of a web of packaging material. This head and tail end (which may not originate from the same web of packaging material) are aligned and superimposed in an overlapping manner in preparation for the formation of the splice. The imaging devices are then again used to acquire a second set of images of the already imaged areas, and the position of the head and tail respectively, and in particular the relative position thereof is fine tuned by comparing the first and the second set of images until a satisfactory match is obtained. Following the fine tuning of the relative position the thus arranged splice is sealed.

The sealing may be performed by using a combination of heat and pressure during a preset period of time. In one or more embodiments the heat is applied from the side of the packaging material that subsequently will be directed towards the interior of a packaging container formed from the packaging material.

The sealing unit, in particular the sealing bar providing the heat and pressure may be pneumatically controlled, hydraulically controlled or spring biased so that a well defined force is applied onto the area to be joined.

Further embodiments are disclosed in the detailed description and it should be emphasized that features of all embodiments may be freely combined to accomplish further advantages, i.e. the embodiments are provided by means of examples, not with the intent to provide an exhaustive list of all alternatives available within the scope of the appended claims.

According to a second aspect the present invention relates to a splicing device configured to perform the splicing method according to any disclosed embodiment.

According to a third aspect the present disclosure provides a method for splicing a first web of packaging material to a second web of packaging material performed in a splicing device having a slitter for cutting the first and or the second web of packaging material and a sealer for sealing a head of the second web of packaging material to a tail of the first web of packaging material, the sealing comprising a heating element and a pressure-application mechanism. The splicing device further comprises an imaging system comprising at least one camera acquiring an image of the packaging material and an image-processing system capable of processing the image. The method further comprising acquiring an image of a section of the first web, cutting the first web at a selected location, cutting the second web at a selected location, superimposing the tail of the first web in relation to the head of the second web, aligning the tail and the head using the previously acquired image, sealing the tail and the head thus bonding the first web the second web.

When cutting the first or the second web the cut may be performed at in an angle in relation to a length direction of the web, such as about 5-15°, e.g. about 7°. When cutting the first or the second web the cut may be performed at in an angle in relation to a thickness direction of the web, such as about 10-30°, e.g. about 20°. The latter approach will generate an undercut surface by means of which the risk of a raw edge of fibrous material being exposed in a sealing area is reduced. This particular feature is disclosed in the previously cited EP1184311, and some further description is available in the drawings and the related detailed description.

When heating the seal it may be preferred to use an electrical heater being in contact with the area to be sealed. It may also be preferred to have the heater arranged on the side that will face towards the interior of a packaging container formed from the packaging material. One effect of such an arrangement is that the heat delivered to the area to be sealed will be controllable to a higher degree. In this way, the seal which will be most affected by moisture (from the contents of the packaging container) will have a superior seal.

The pressure-application mechanism may be controllable to apply a particular pressure onto the area to be sealed. This may be accomplished by means of a pneumatic system, and hydraulic system or a spring biased system, to mention a few. The pneumatic system is presently the preferred choice. Analogous to the effect of the heater this will have the effect that the pressure applied to the area to be sealed may be delicately controlled to the benefit of the seal performance. A further effect is that the pressure may be made independent on the thickness of the area to be sealed, which otherwise is a direct effect for pressure-application mechanisms utilizing a fixed gap. An example of a fixed-gap mechanism would be a clamping mechanism where a fixed clamping gap results in that the pressure applied to the surface will be directly affected by the thickness of the material. Furthermore, a pneumatic system enables a delicate control of time during which pressure is to be applied.

Summarizing the above effects it will be possible to delicately control pressure, temperature and time, and by doing so the quality of the seal will be very predictable. In a real example it will be possible to map the seal quality to any and all of the parameters and to find a suitable value for each being allowing for small variation without detrimental results. In this way a suitable parameter setup may be acquired for any and every packaging-material specification.

Some details in regard of various options for controlling pressure, temperature and slitting have been included in separate paragraphs. It is to be understood that, unless technically impossible, these options may be freely combined for the realization of a number of various embodiments even if not disclosed in detail.

Aligning of the head in relation to the tail may involve a plurality of sensors, e.g. imaging devices, for tracking an edge of the web. In one or more embodiment the one or more additional imaging devices may be used to ensure that the aligning of the webs are correct in relation to the image of the first camera.

In one or more embodiments the initiation of the splicing sequence comprises a localization of an area to be spliced. This may be performed in relation to previously recorded data providing information of an area to be removed from the web, a so called doctoring operation, or at may be the normal addition of a second web of packaging material, a regular splicing operation. Following that localization the web is imaged and cut. Between the imaging and the cutting the web does not have to be stationary. Rather the web may be repositioned to a slitter where it is slit (cut) in a suitable position. The suitable position may in one or more embodiments correspond to an area where the cut will intersect a minimum amount of crease lines.

Crease lines have not been mentioned before in the present description. Though not considered critical a short description would be that the crease lines are folding indications pressed into the packaging material, and when the packaging material is intended for the formation of packaging containers a pattern of crease lines will be "printed" onto the packaging material. Looking at a packaging container the majority of crease lines are located in the area from which the bottom and top of the packaging container is to be formed, and therefore the cut will be made in an area corresponding to the main body of the packaging container. The exact position is not that crucial and the method may be applied to material not having any crease lines. The dynamics and use of crease line is an area of research itself, and for the purposes of the present disclosure the skilled person will enough knowledge even without the above short explanation. There is one additional reason for making the cut somewhere between the top and bottom of the packaging container to be formed. That reason relates to that a package being formed from a section of packaging material comprising a splice is usually discarded. By having the cut in the middle of the container it is ensured that only one single packaging container affected by the splice and thus only one packaging container is discarded. This fact may raise the question as of why the performance of the splice is so important if the resulting packaging container is discarded anyway. One answer is that the package is not discarded before it has been filled since that is the way most filling systems operate. Any leakage or other malfunction before will therefore cause significant problems, and for that reason the splice need to be intact, and able to withstand liquid pressure.

In the method operations such as when the web is moved from a known position to a slitter or when the free end is moved to a splicing position prior to bonding may be performed "blind". The implication of this is that the web may move a predetermined distance without any delicate control. The position of a cut may not be that crucial since the tolerances will be set by the fine tuning performed after the tail and the head have been superimposed in the splicing position.

A method according to the above or below is generally performed in a machine where the web of packaging material is rolled from a first reel to a second reel, wherein the splicing device is arranged in between the first and the second reel, along the path of the web. When reference is made to the web being moved it is to be understood that the web is forwarded or reversed from the first roll to the second and therefore moves in the length direction. The drive may be performed by means of a drive unit driving the first and/or the second reel, yet further positioning arrangements may be provided along the path of the web in order to enable fine tuning of the web position.

According to second aspect the present disclosure relates to a device for performing the method according to any of the embodiments disclosed. In other words, there could be a device for each embodiment of the method, not necessarily one device that could perform the method of all embodiments.

Tail and head are used to describe the ends to be fused, namely the trailing end of the first web of packaging material and the leading end of the second web of packaging material respectively.

Notably, the first web of packaging material and the second web of packaging material may be the same web of packaging material having been cut in a doctoring operation where a defect segment has been removed. In such an example the second web corresponds to the second portion of the first web, and the description will be fully equivalent.

It should also the emphasized that the imaging procedure, and in particular to image processing is not part of the present invention as such. There are obviously several ways to acquire images and to process images as well. Likewise there are many ways of processing two images to identify whether they are similar or not. A simplistic approach would be to identify a number of marks, e.g. two on the tail of the first web and two on the head of the second web and ensure that the positional relationship is the same on the head and tail as for the unsceaved section of the web. Modern image analysis enables a multitude of points being used.

DETAILED DESCRIPTION

Figure 1:
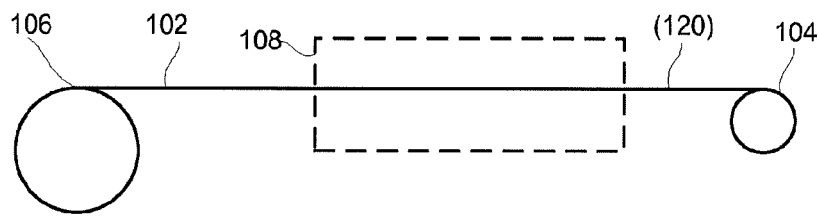
FIG. 1 is a very schematic side view of a rudimentary system for processing a web of packaging material

FIG. 1 illustrates in ultimate simplicity the setup of the present disclosure. What is shown is a web 102 of packaging material being wound from a first reel 104 to a second reel 106. Between the first and the second reel the web 102 passes over and under a number of rollers and guides not necessary to be described in detail in the context of the present invention and merely illustrated by the hatched rectangular area 108. Furthermore, at least one slitter and a sealer comprising a pressing device with a heater and an anvil are arranged along the path of the packaging material web. The latter components are not shown in FIG. 1, yet they will be shown in the description of further drawings.

Figure 2:
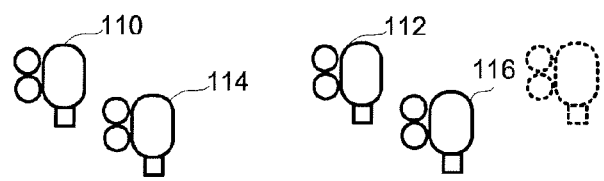
FIG. 2 is the first view in a sequence of three showing splicing of a first web of packaging material to a second web of packaging material.

One sequence according to the present disclosure will be described referring to FIGS. 2-4. In FIG. 1 the general setup is shown. The first reel is not shown since FIG. 2 illustrates a situation where the winding from the second reel to the first reel 106 is about to end. A tail 103, i.e. the trailing free end, of the first web 102 of packaging material is shown. A number of imaging devices 110, 112, 114, 116 are arranged such that they may monitor various portion of the packaging material. In the present arrangement the cameras 110 and 112 are arranged to monitor different portion of one lateral edge of the packaging material web, while cameras 114 and 116 are arranged to monitor distinguishable areas in the main body of the packaging material web. "Distinguishable areas" may correspond to a register mark or merely a particular area of the décor. There are many kinds of imaging devices commercially available and for simplicity they will be referred to as "cameras" in the following. Any type of digital or analogue imaging devices suitable for the purpose may be used. Returning to FIG. 2, the tail end 103 of the first web is located, and an area corresponding to an area to be spliced is imaged using one or more cameras. So far the area is not affected by any splicing and in the present embodiment the cameras 110 and 112 acquires images of the edge portions while the cameras 114 and 116 register two other areas of the unaffected web. These images will be used as a template for the splicing operation to come, but first the first web is moved to a slitter where it is cut in an appropriate way, e.g. in the way suggested in the patent document referred to previously. Following the slitting or cutting a head end 121 of the second web 120 is cut or slitted in a similar manner. A general rule is that the first web and the second web are cut in the same angle in relation to a transversal direction of the webs, so as to obtain a symmetric splice, another reason being that the same slitter is used for the operation. The angle in a thickness direction—the undercut, however, does not necessarily have to be the same, and the undercut as well as the effects thereof will be explained in closer detail referring to FIGS. 5 and 6.

For localization of the correct slitting position use may be made of a fifth camera 118, yet other means are possible and since it is not the main theme of the present application these other means will not be discussed in detail. The camera 118 may monitor the position of a register mark, and by moving the web so as to maintain the register mark in a correct area in relation to the camera a correct slitting position may be localized. In the field of printing a register mark may have a specific meaning, yet for the purposes the present embodiment any defined area of the décor of the packaging material may be used. The exact position of the slit is not critical since the décor of the packaging material web is not continuous but arranged in increments of a single packaging container.

After having been cut or slitted the tail 103 is moved to a splicing area, by moving the web 102 a fixed distance controlled by a control unit of the splicing device. In a next step, not shown, a new reel 104 may be arranged, and a second web 120 of packaging material may be thread through the rollers of the splicing device. The leading end 121 of the second web is cut at a suitable location, ensuring an overlap. As described above a "suitable position" may be found using the imaging system, or alternatively the slitter may have a sensor system detecting crease lines or register marks of the web by other means. Example includes optical marks and magnetic marks, etc., as well as defined areas of the décor. Irrespective of the sensor system used the head is cut at the same angle in the transversal direction of the web, yet preferably with an undercut for reasons to be explained.

For the purposes of the present disclosure the second web 120 may as well correspond to the first web, i.e. in a situation where a section of the web has been removed there is only one web being spliced. For the actual splicing operation this is not material.

Following the slitting the head 121 of the second web is moved to the splicing area by being moved a fixed distance, and the tail 103 is superimposed onto the head 121. Based on controlling the movement of the web 102 and 120 the splice may be localized with a tolerance in the order of a couple of millimeters. Subsequently the position of the tail 103 and the head 121 is fine tuned by input from the at least one camera. The image of the unscaved web is compared to the monitored image of the corresponding area of the splice. The tail and the head respectively are clamped to a positioning device and then their relative position is altered until the position is in agreement with the previously acquired image of the unscaved area.

For the present, embodiment the tail 103 and head 121 is moved until all cameras 110, 112, 114 and 116 acquires images identical to the once previously acquired. At that time the head and the tail are bonded to each other and the splicing operation is finalized. In any downstream operation the splice will now not affect the operations. Still, once a packaging container comprising the splice has been manufactured it is standard operation to waste that packaging container, at least when it contains a liquid product.

The actual imaging may be done in numerous different ways and in the following some suggestions are given.

In first example there is one camera for the head and one camera for the tail respectively. Each camera is arranged to image a particular section of the packaging material web. The particular section may be a register mark, or it may be a particular portion of the décor. One effect of using a particular portion of the décor is that the method becomes very versatile. As long as the particular portion is distinguishable the method may be used. Before splicing is commenced each camera acquires an image each. These images will act as the target; once the splice is arranged such that the images are identical, the splice will not affect downstream operations. After the initial images are acquired the method proceeds according to what has been already described.

In a second example the two cameras are not imaging a particular portion of the web, they merely acquires an image each. A condition for the imaged areas is that one camera should provide a view of an area that will be present on the tail, and the other should provide a view of an area present on the head, in a splicing position that is. The method then proceeds according to what has been already described.

In a third example a single camera is used, and this camera acquires an image of an area that will be present on both the head and the tail; i.e. the area imaged of the unscaved web will include the splice once the splicing is performed. This example will comprise some more elaborate image processing and recognition, yet as such that image recognition may be a straightforward operation.

In a fourth example one or more cameras are arranged for monitoring a position of a lateral edge of the web. Several downstream operations may be based on the assumption that at least one of the lateral edges of the web is considered as having zero tolerance. For this reason it may be beneficial to monitor the position of that lateral edge. The monitoring may be performed by acquiring images in the same way as has already been described, implying that there will be two cameras for the head of the web and two cameras of the tail of the web. Apart from ensuring correct positioning of one of the lateral edges there is an additional advantage in utilizing four points instead of two when aligning the head and the tail respectively. This corresponds to the example as described referring to FIGS. 2-4.

Unless technically impossible, the examples given may be combined for further or similar effect.

Figure 4:
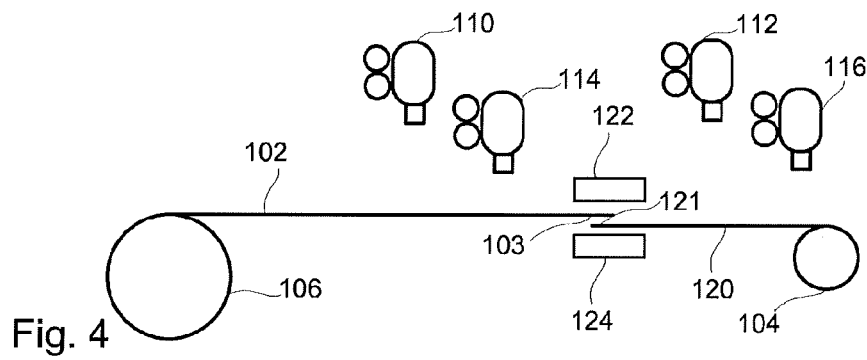
FIG. 4 is the third view in a sequence of three showing splicing of a first web of packaging material to a second web of packaging material.

Following the fine tuning the tail and the head are bonded to each other using the sealing device indicated by an anvil 122 and a sealing bar 124 in FIG. 4. In the sealing device pressure to the splicing area and at the same time it is heated. The sealing is performed for a predetermined period of time. This bonds the first web to the second web, the second web to the first web, or both, thus finalizing the splicing sequence. As mentioned previously the above splicing sequence may be performed for the reason of removing a section of a single web or to add a second web to a first web, irrespective of which the process will be similar.

Figure 5:
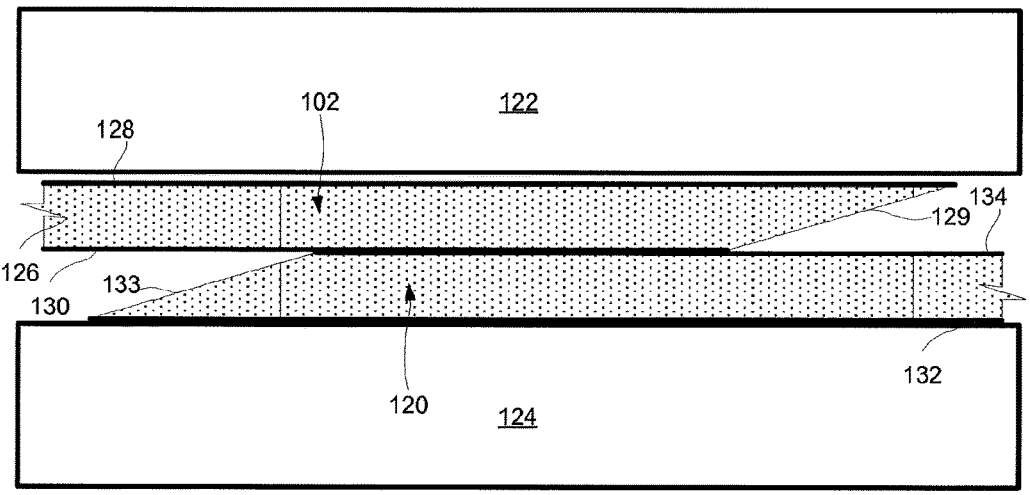
FIGS. 5 and 6 illustrate a sequence starting with a position corresponding to the one shown in FIG. 4, yet with some more detail.
Figure 6:
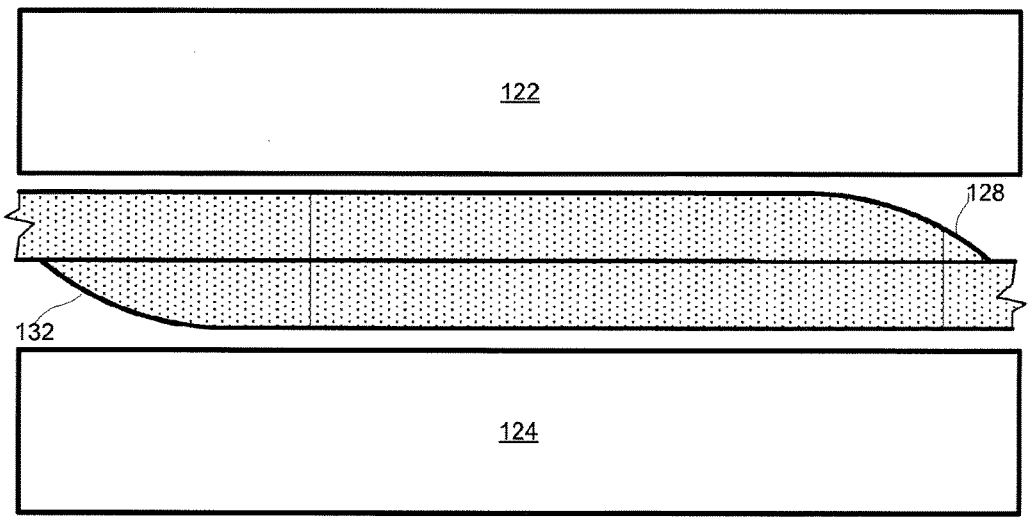

Some more details of the sealing, or bonding, are shown in FIGS. 5 and 6. In FIG. 5 it is shown in a detailed view how the tail of the first web has been superimposed onto the head of the second web. A simplified packaging laminate is shown in order to elucidate the use of an undercut head and tail. The packaging laminate has a carton or fibrous core 129 and 133 respectively, which may be prone to absorb moisture, having a detrimental effect on the properties of the packaging laminate. To protect the carton core and to provide other barrier properties it is sandwiched between two layers of plastic 128, 130 and 132,134 respectively. Further layers may be applied, usually to accomplish some barrier properties against liquids, particular gases, and light. The number of "recipes" used for packaging laminate are vast and evolving and it is not the purpose of the present invention to pick a selected number of laminates, nor should the present invention be limited in view of only laminates mentioned since the present disclosure relates to a method and device for splicing.

The view of FIG. 5 illustrates the situation prior to bonding, and the view of FIG. 6 illustrates the situation after bonding. After bonding the pressure and temperature have bonded the first web to the second web where the plastic layer of the first web is in contact with the plastic of the second web. Furthermore, due to the undercut edge the plastic layer on the remote side (remote to the other web) of each web has been bonded to the other web. In this way the carton core is fully protected after sealing.

A sealing anvil 122 is arranged on the side of the first web and a heated sealing bar 124 is arranged on the opposite side, the side of the undercut second web.

Temperature and pressure is applied for a predetermined period of time, and as the sealing bar is retracted in relation to the anvil the result as shown in FIG. 6 appears. In an embodiment where the heated bar 124 is arranged on what is to be a side facing inwards in a packaging container—once formed—an effect may be that the performance of the sealed undercut end may be optimized such that an optimum pressure, temperature and time is used when bonding the first web and the second web.

To further describe the present disclosure some plan views are shown, still very schematic. The sequence of FIGS. 7-9 will be explained in the following. The purpose of the illustration is to exemplify how the method enables splicing with adequate tolerances. The web is shown as seen from above, and the hatched areas correspond to areas where creasing patterns for top and bottom of the packaging container are arranged. In these areas there are a lot of crease lines and therefore they are not will suited for splicing operation, though it would by no means be impossible to accomplish a splicing operation in such an area. Between the top creasing pattern and the bottom creasing pattern the creasing pattern for forming the body of the packaging container is situated. This creasing pattern mainly consists of creasing lines extending between the top creasing pattern and the bottom creasing pattern, and there are not as many creasing lines per surface area and the when formed the resulting container will not be folded in as many locations. This makes the creasing patterns dedicated for the body of the container more suitable for a splicing operation.

Figure 3:
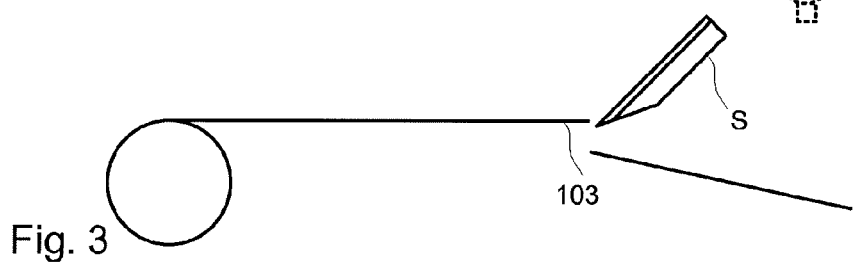
FIG. 3 is the second view in a sequence of three showing splicing of a first web of packaging material to a second web of packaging material.
Figure 7:
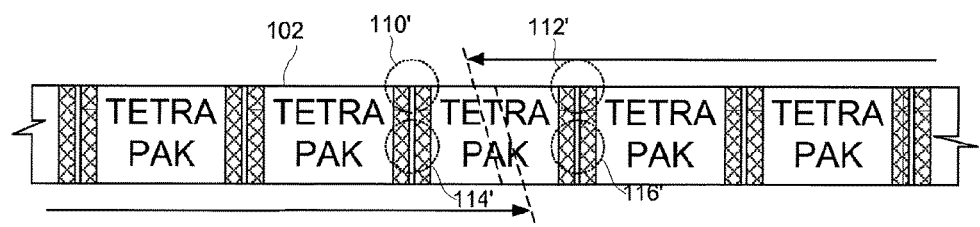
FIGS. 7-9 illustrate yet another sequence similar to that of FIGS. 2-4 yet from above.
Figure 8:
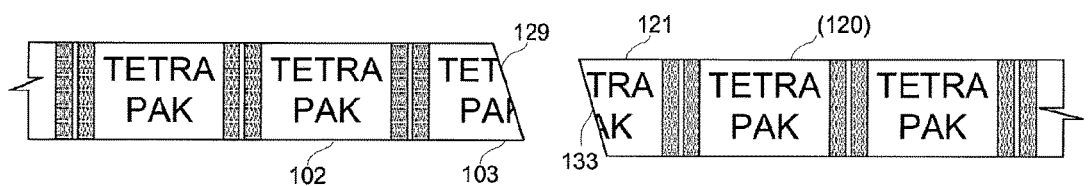
Figure 9:
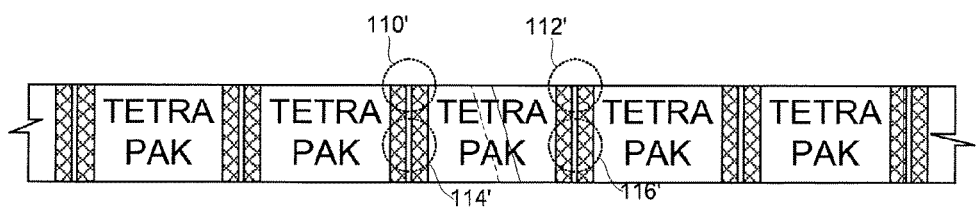

In FIGS. 7-9 the cameras are not shown, though to facilitate understanding of the already described embodiments areas corresponding to areas imaged by the cameras shown in FIGS. 2-4 have been referred to using the same reference numbers with the addition of a prim sign, i.e. an exemplifying view of camera 110 is designated 110' etc.

In FIG. 7 a web 102 prior to splicing is shown. In the particular example it is a single web, and the scenario is that a segment of the web is to be removed due to a defect, i.e. a so called doctoring process. In the first step imaging of the areas 110', 112', 114' and 116' is performed. As has been mentioned before this is performed before the web is slit. The inclined lines 103' and 121' are meant to indicate the tail and the head respectively, showing how the web is slit to form an overlap. First the tail 103' is cut/slit downstream the defect segment, and thereafter the head is cut upstream the defect segment of the web, or vice versa. At least one top/bottom pattern is removed in the doctoring process since the head and the tail cannot be cut in the same body pattern due to the overlap. Considering the view of FIG. 8 it is self-explanatory that the situation at this point forward is the same for a doctoring process where one single web is mended as for a situation where a second web is spliced to a first web. Therefore the present disclosure should not be limited to a particular reason for performing the splice, but to the splicing method as such.

In the view of FIG. 9 the head and the tail have been superimposed and the cameras are again activated to ensure that the positioning is correct before the two ends are attached to each other. The disclosed method, according to any of the embodiments thereof is highly accommodating to the design (or décor) of the web of packaging material. Any acceptable flaw in the design will be imaged in the first step and accounted for automatically in the splicing operation.

In one or more alternative embodiments, not disclosed in detail a first set of images acquired are acquired from a memory rather than from the actual web to be processed. Such an embodiment may require some more elaborate web handling but apart from that the method as such may be put into practice without any significant issues. Though the method is not as accommodating to the design of the web being processed, a beneficial effect may be that one step may be eliminated from the method as performed on an actual web of packaging material, which may save some time in the process.

The invention claimed is:

1. A method for splicing a web of packaging material, comprising:
    guiding the web of packaging material through a splicing device comprising one or more imaging devices, a slitter, and a sealing unit;
    acquiring a first set of images of one or more areas of the packaging material,
    storing the acquired first set of images,
    slitting the web of packaging material in one or more locations to form a tail end and a head end in the web of packaging material after the acquiring of the first set of images,
    aligning the head end and the tail end and superimposing one on the other in preparation for forming a splice,
    utilizing the one or more imaging devices to acquire additional images of the one or more areas of the packaging material after the superimposing of the head end and the tail end of the web of packaging material and the stored acquired first set of images to fine tune the alignment of the head end and the tail end, wherein all of the one or more imaging devices are used for the acquiring of the first set of images and the additional images, sealing the splice.

2. The method of claim 1, wherein the sealing is performed using a combination of heat and pressure during a predefined period of time.

3. The method of claim 1, wherein the one or more imaging devices consists of a single imaging device.

4. The method of claim 1, wherein the first set of images is acquired from an unaltered portion of the web of packaging material before any splicing of the web of packaging material.

5. The method of claim 1, wherein the first set of images is stored in a memory for use on a subsequent web of packaging material.

6. The method of claim 1, wherein the additional images of the one or more areas of the packaging material are compared to the stored acquired first set of images to fine tune the alignment of the head end and the tail end, the fine tuning being complete when the additional images and the stored acquired first set of images are identical.

7. The method of claim 1, wherein
    the one or more imaging devices are each fixed in the splicing device so that the web of packaging material is guided relative to the fixed one or more imaging devices, and
    the method further comprises moving the head end and the tail end of the web of packaging material after the slitting of the web of packaging material by a fixed distance so that the additional images are taken at a same location of the web of packaging material as the first set of images.

8. The method of claim 1, wherein the one or more imaging devices consist of four imaging devices, and two of the four imaging devices are positioned upstream of the one or more locations where the slitting occurs, the other two of the four imaging devices are positioned downstream of the one or more locations where the slitting occurs, and all of the four imaging devices collectively are used to acquire both the first set of images and the additional images.

* * * * *